US008641520B2

(12) United States Patent
Vann

(10) Patent No.: US 8,641,520 B2
(45) Date of Patent: Feb. 4, 2014

(54) WAGER EQUALIZED BONUS TRIGGER ALLOCATION AND REDEMPTION

(75) Inventor: Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 107 days.

(21) Appl. No.: 13/281,333

(22) Filed: Oct. 25, 2011

(65) Prior Publication Data

US 2012/0108325 A1 May 3, 2012

Related U.S. Application Data

(60) Provisional application No. 61/407,316, filed on Oct. 27, 2010.

(51) Int. Cl.

*A63F 9/24* (2006.01)
*A63F 13/00* (2006.01)
*G06F 17/00* (2006.01)
*G06F 19/00* (2011.01)

(52) U.S. Cl.

USPC .................................. 463/27; 463/16; 463/26

(58) Field of Classification Search

USPC ............................................................ 463/27

See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |

(Continued)

FOREIGN PATENT DOCUMENTS

| | | | |
|---|---|---|---|
| CA | 2 334 546 | 8/2001 | G07F 17/34 |
| DE | 195 15 983 A1 | 11/1996 | G07F 17/34 |

(Continued)

OTHER PUBLICATIONS

Third Party Submission dated Jul. 2, 2012 (2 pages).

(Continued)

*Primary Examiner* — Kevin Y Kim
(74) *Attorney, Agent, or Firm* — Nixon Peabody LLP

(57) ABSTRACT

A method of conducting a wagering game includes awarding one or more bonus triggers in a randomly selected outcome of a base wagering game. The player is allowed to play a progressive game having a first expected value and is eligible to receive a progressive award in the progressive game if an X number of bonus triggers is accumulated. If the number of bonus triggers accumulated is less than X, the player is allowed to play a bonus event, which is different than the progressive game and has a second expected value, if a selection is received to indicate player selection of the bonus event. The bonus event has a bonus award that is less than the progressive award. The second expected value is less than or equal to the first expected value.

22 Claims, 9 Drawing Sheets

(56) References Cited

U.S. PATENT DOCUMENTS

| | | | | |
|---|---|---|---|---|
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,235,011 | B2 * | 6/2007 | Randall et al. | 463/25 |
| 7,481,430 | B1 | 1/2009 | Jackson et al. | 273/139 |
| 7,914,377 | B2 * | 3/2011 | Benbrahim et al. | 463/25 |

| | | | | |
|---|---|---|---|---|
| 2002/0138594 | A1 | 9/2002 | Rowe | 709/219 |
| 2002/0151345 | A1 | 10/2002 | Byrne | 463/18 |
| 2002/0151346 | A1 * | 10/2002 | Devaull | 463/20 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036422 | A1 * | 2/2003 | Baerlocher et al. | 463/20 |
| 2003/0036430 | A1 | 2/2003 | Cannon | 463/42 |
| 2003/0045337 | A1 | 3/2003 | Byrne | 463/16 |
| 2003/0045351 | A1 | 3/2003 | Gauselmann | 463/29 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148807 | A1 | 8/2003 | Acres | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228897 | A1 * | 12/2003 | Vancura | 463/20 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Englman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0189380 | A1 | 8/2006 | Schultz et al. | 463/20 |
| 2006/0223615 | A1 * | 10/2006 | Englman | 463/17 |
| 2006/0281527 | A1 | 12/2006 | Dunaevsky et al. | 463/20 |

(56) References Cited

U.S. PATENT DOCUMENTS

| | | | | |
|---|---|---|---|---|
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2008/0076503 | A1 * | 3/2008 | Mattice et al. | 463/16 |
| 2008/0076513 | A1 * | 3/2008 | Esses et al. | 463/20 |
| 2008/0125213 | A1 | 5/2008 | Inamura | 463/20 |
| 2009/0131149 | A1 | 5/2009 | Jackson et al. | 463/20 |
| 2009/0137306 | A1 | 5/2009 | Yoshizawa | 463/20 |
| 2009/0298574 | A1 | 12/2009 | Gauselmann | 463/20 |
| 2009/0305777 | A1 | 12/2009 | Anderson | 463/27 |
| 2010/0304830 | A1 | 12/2010 | Englman et al. | 463/17 |

FOREIGN PATENT DOCUMENTS

| | | | | |
|---|---|---|---|---|
| DE | 196 24 321 | A1 | 1/1998 | G07F 17/32 |
| EP | 0 521 599 | A1 | 1/1993 | G07F 17/34 |
| GB | 2 153 572 | A | 8/1985 | G07F 17/34 |
| GB | 2 181 589 | A | 4/1987 | G07F 17/34 |
| GB | 2 242 300 | A | 9/1991 | G07F 17/34 |
| GB | 2 313 792 | A | 10/1997 | A63F 5/00 |
| GB | 2 333 880 | A | 8/1999 | G07F 17/34 |
| JP | 2005-143745 | | 9/2005 | A63F 9/00 |
| WO | WO 99/03078 | A1 | 1/1999 | G07F 17/34 |
| WO | WO 99/19037 | A1 | 4/1999 | A63F 9/22 |
| WO | WO 01/33478 | A1 | 5/2001 | G06F 19/00 |
| WO | WO 03/026754 | A1 | 4/2003 | A63F 5/00 |
| WO | WO 03/083789 | A1 | 10/2003 | |

OTHER PUBLICATIONS

Article for “Easy Riches” by Sigma Game, Strictly Slots, 1 page (Aug. 2001).

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

FIG. 8
500
502
506
504e
504d
508
510
512
514
516
COLLECT 5 TO QUALIFY FOR PROGRESSIVES
1X
2X
3X
4X
5X
PROGRESSIVE
PLAY
Progressive
5X+
Collected
Qualified for
Progressive
WON
125
MENU
1¢
4
TOTAL BET
100
CREDITS

WAGER EQUALIZED BONUS TRIGGER ALLOCATION AND REDEMPTION

REFERENCE TO RELATED APPLICATIONS

This application is related to and claims priority to U.S. Provisional Patent Application Ser. No. 61/407,316, filed Oct. 27, 2010, and titled "Wager Equalized Bonus Trigger Allocation And Redemption," which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a wagering game in which a player accumulates eligibility for participating in a progressive game.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

According to one aspect of the present invention, a method of conducting a wagering game includes awarding one or more bonus triggers in a randomly selected outcome of a base wagering game. The player is allowed to play a progressive game having a first expected value and is eligible to receive a progressive award in the progressive game if an X number of bonus triggers is accumulated. If the number of bonus triggers accumulated is less than X, the player is allowed to play a bonus event, which is different than the progressive game and has a second expected value, if a selection is received to indicate player selection of the bonus event. The bonus event has a bonus award that is less than the progressive award. The second expected value is less than or equal to the first expected value.

According to another aspect of the invention, a gaming system includes a wager input device for receiving a wager from a player, a display for displaying a base wagering game in response to receiving the wager from the player, an one or more processors communicatively coupled to the display. At least one of the processors is operative to select at least one randomly selected outcome from a plurality of outcomes of the base wagering game, and to award one or more bonus triggers in the randomly selected outcome of the base wagering game. If an X number of bonus triggers is accumulated, the player is allowed to play a progressive game having a first expected value. If less than the X number of bonus triggers is accumulated and a selection is received from the player, the player is allowed to play a bonus event that is different than the progressive game. The bonus event has a second expected value that is less than or equal to the first expected value.

According to yet another aspect of the invention, a method is directed to conducting a wagering game for a human player. The wagering game includes a game sequence in which the player provides an input and a wagering game outcome is determined. The method includes using a user interface device to accept the player input, and transforming the player input to electronic data signals indicative of a wager to play the wagering game. One or more processors are used to interpret the wager from the data signals and to cause the recording of a digital representation of the wager in one or more storage devices. At least one of the processors is used to initiate the game sequence of the wagering game and to cause at least one of the display devices to display a base wagering game. At least one of the processors is used to select a randomly selected outcome from a plurality of outcomes of the base wagering game and to award one or more bonus triggers in the randomly selected outcome of the base wagering game. If an X number of bonus triggers is accumulated, the player is allowed to play a progressive game having a first expected value. If less than the X number of bonus triggers is accumulated and a selection is received from the player, the player is allowed to play a bonus event different than the progressive game. The bonus event has a second expected value that is less than or equal to the first expected value. An outcome of the game sequence is determined.

Additional aspects of the invention will be apparent to those of ordinary skill in the art in view of the detailed description of various embodiments, which is made with reference to the drawings, a brief description of which is provided below.

Figure 1:
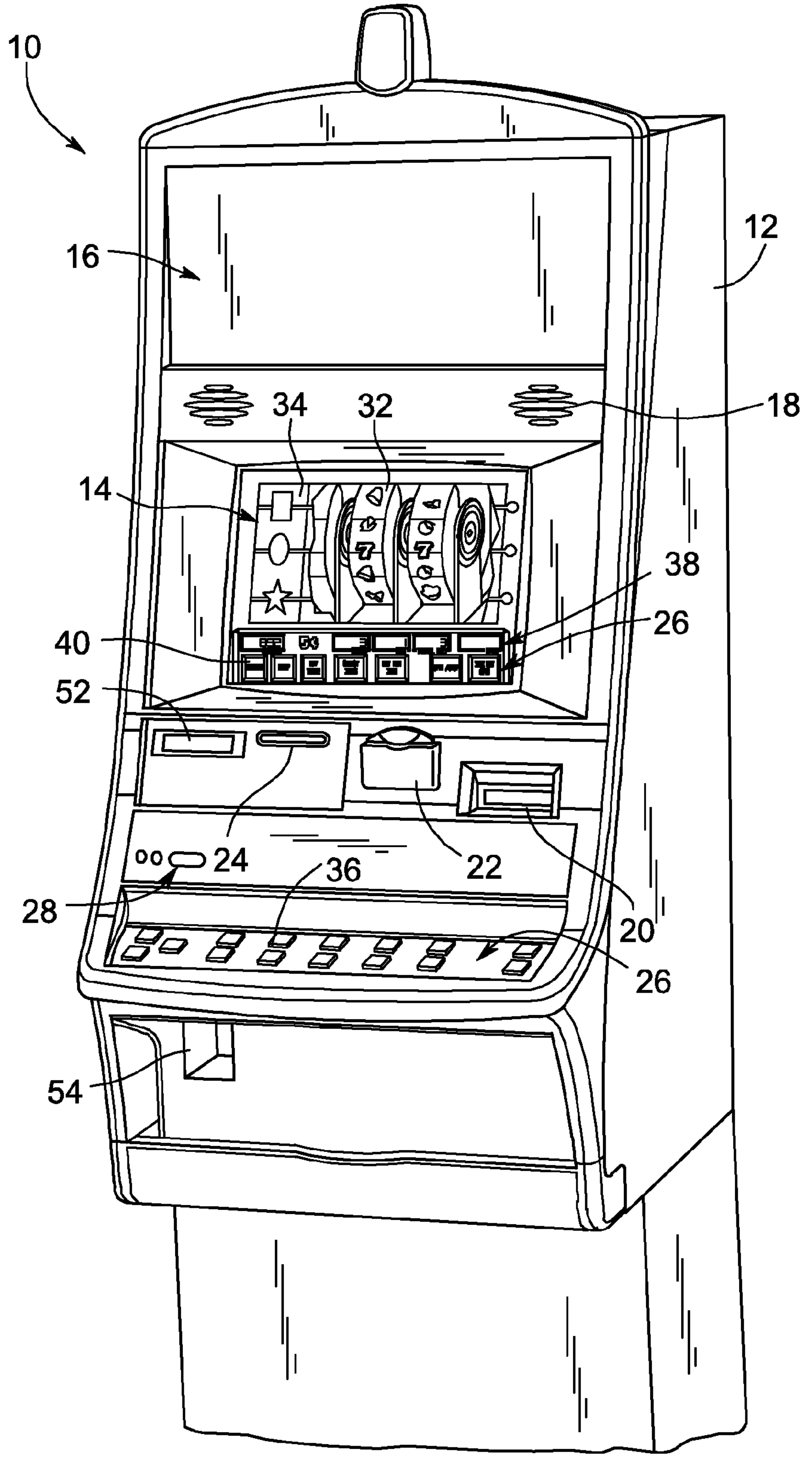
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
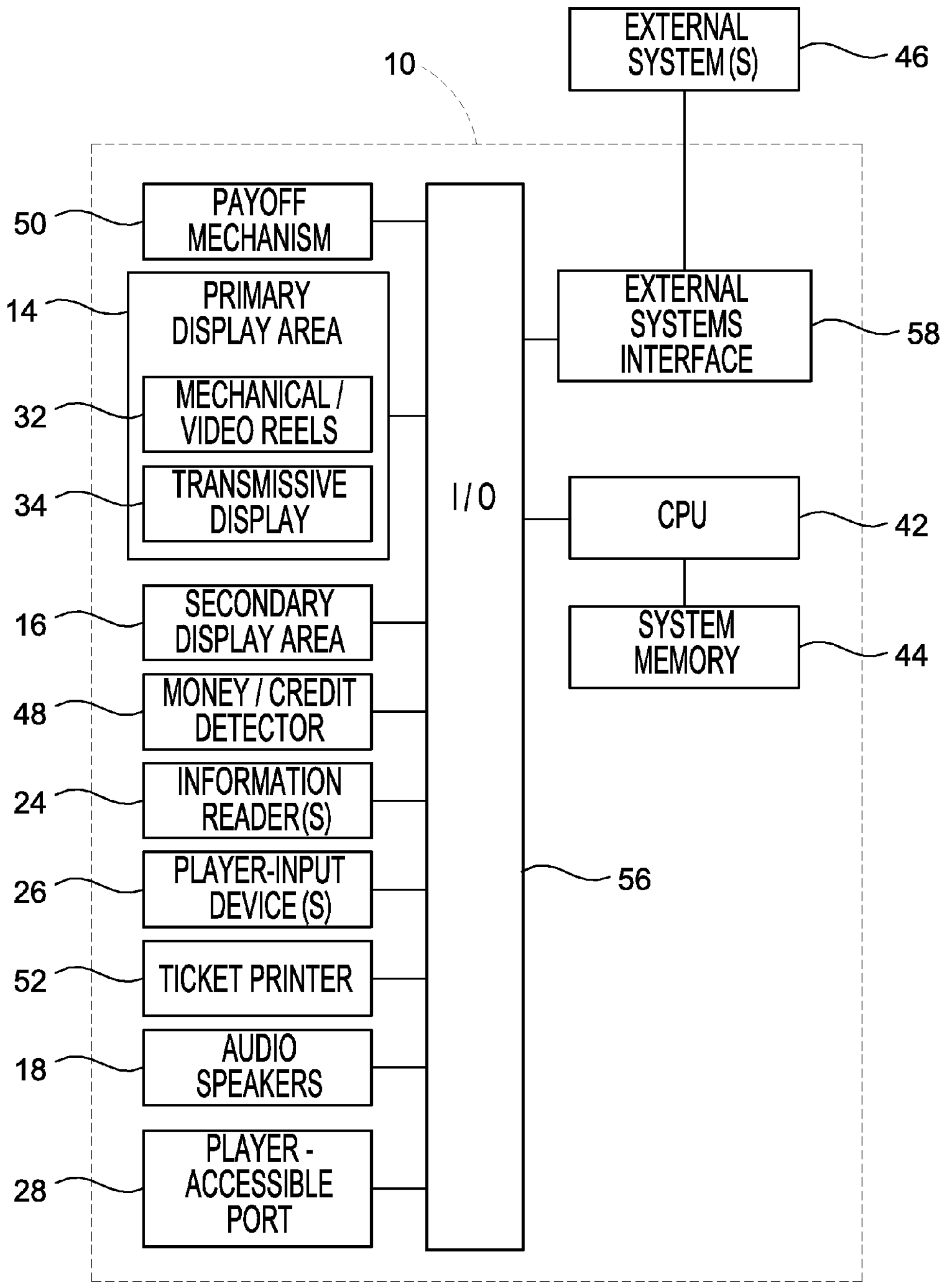
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
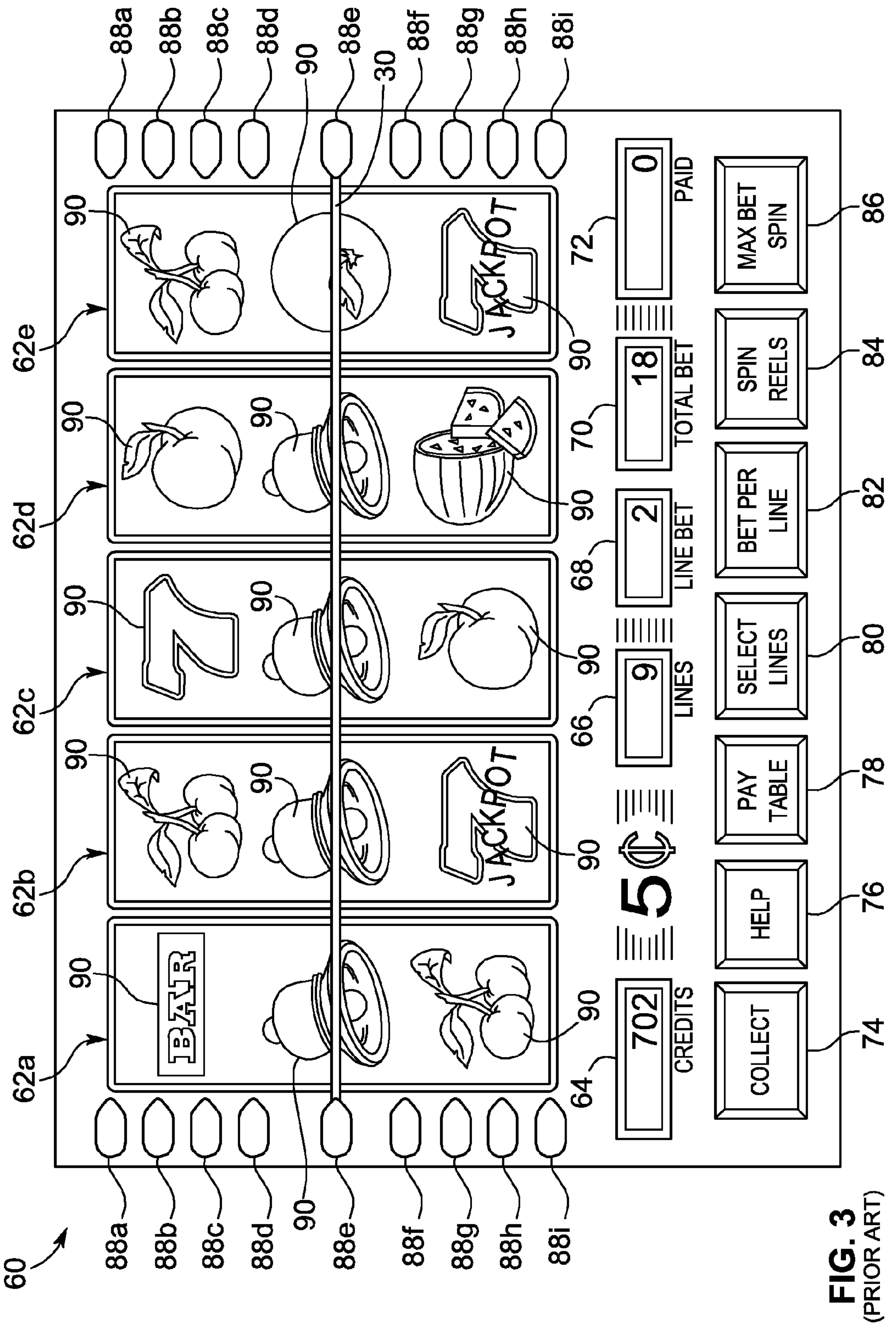
FIG. 3 (PRIOR ART)
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
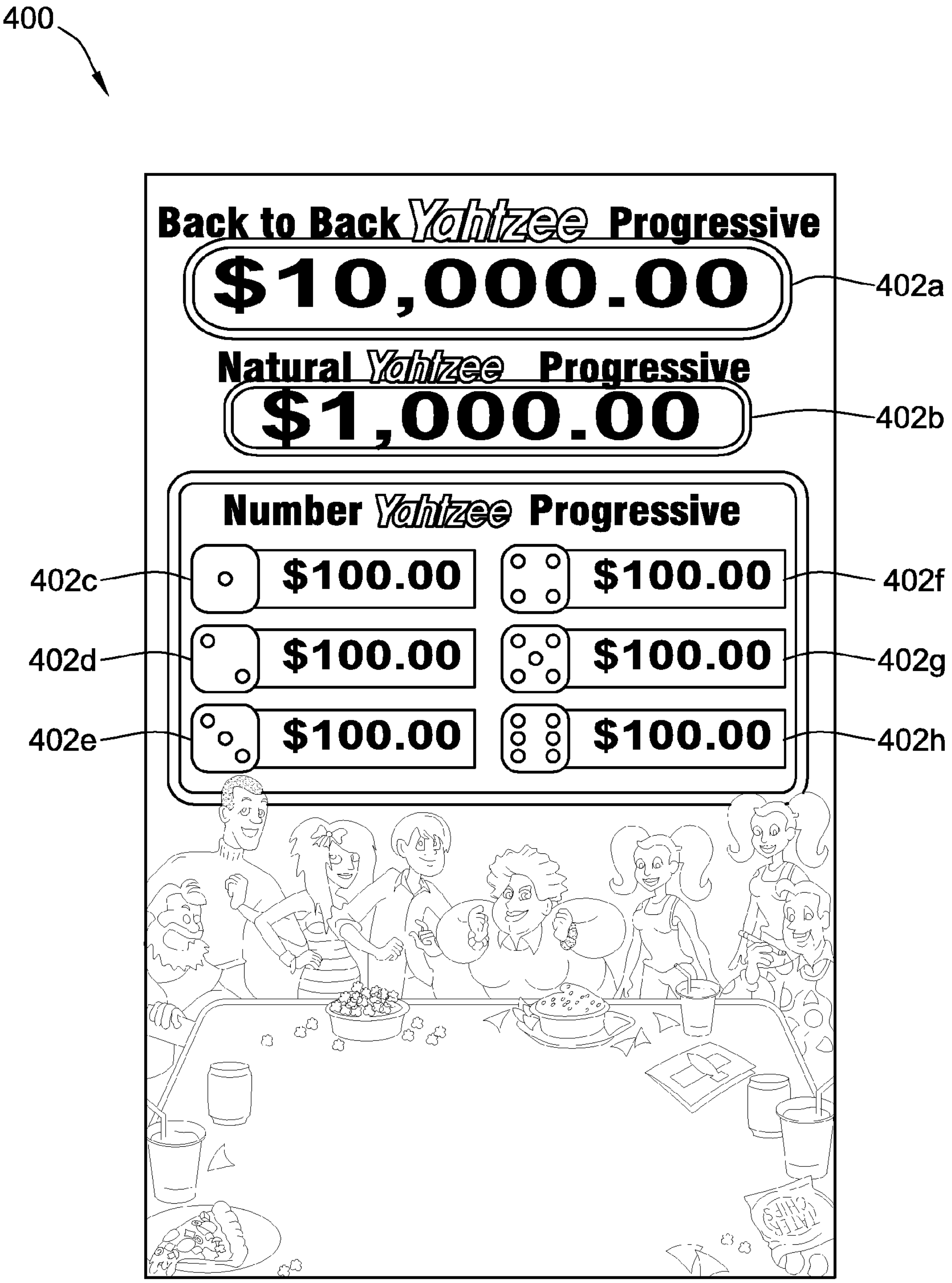
FIG. 4 is an image of an exemplary screen of a progressive game illustrating a plurality of progressive awards.

Referring now to FIG. 4, a display area 400 shows a plurality of progressive awards associated with a Yahtzee® wagering game. According to this example, a player playing either a base game or a bonus game of the wagering game may become eligible for receiving one or more of eight different progressive awards 402*a*-402*h*. For example, the progressive awards 402*a*-402*h* include a "Back to Back Yahtzee Progressive" 402*a* having a reset value of $10,000.00 and a "Natural Yahtzee Progressive" having a reset value of $1,000.00. Other "Number Yahtzee Progressive" awards 402*c*-402*h* have a reset value of $100.00, each.

To play the wagering game and be eligible for receiving one or more of the progressive awards 402*a*-402*h*, the wagering game requires certain eligibility criteria to be accumulated. In contrast, in current gaming systems, player eligibility for receiving a progressive award is typically based on whether the player has made a maximum wager, i.e., "Max bet required to be eligible for progressives." As described below, player eligibility for receiving a progressive award in the present invention is determined independently of the received wager.

Figure 5:
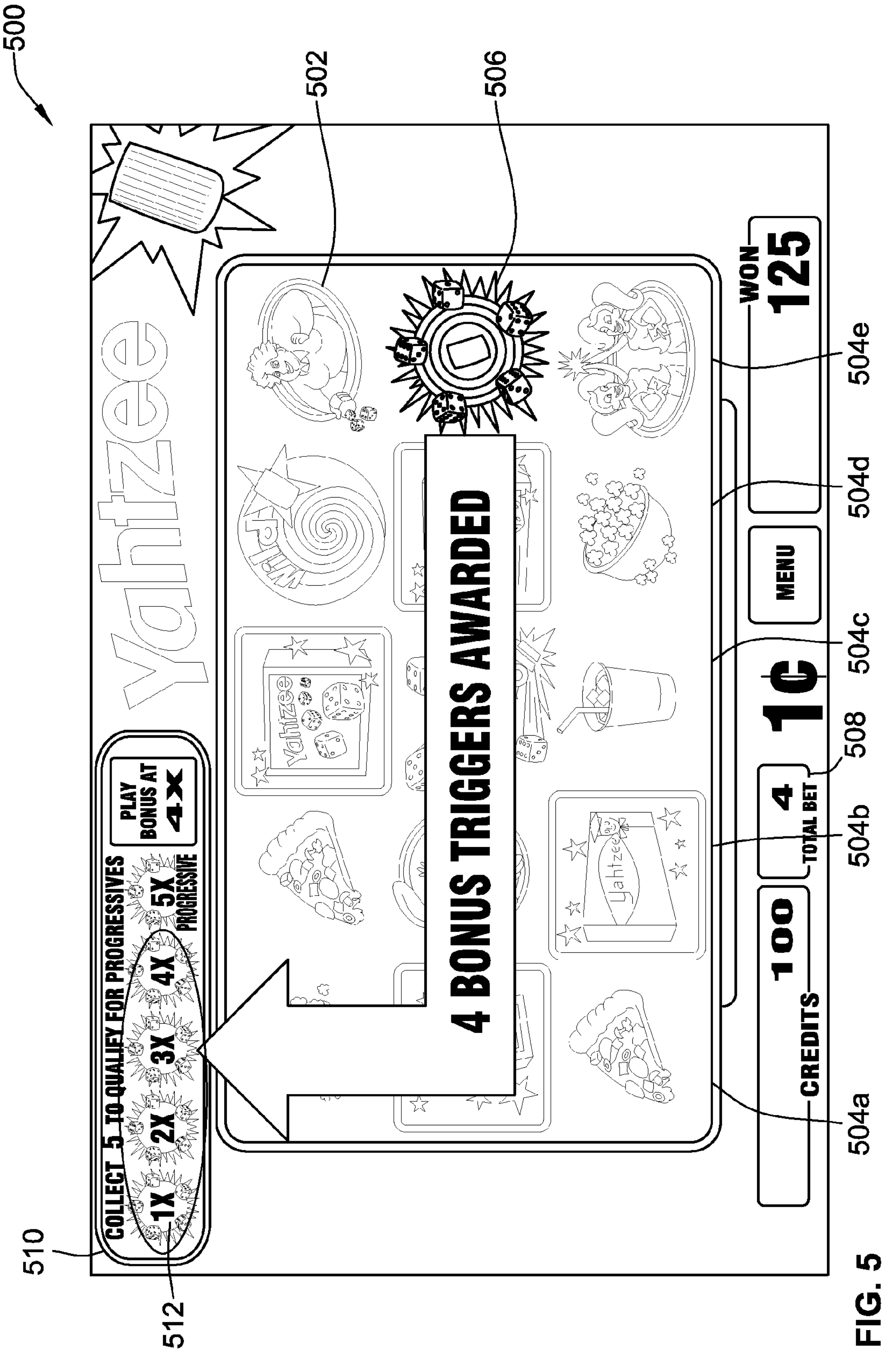
FIG. 5 is an image of an exemplary basic-game screen of a wagering game displayed on a gaming terminal and in which four bonus triggers are awarded.

Referring to FIG. 5, a display area 500 shows a randomly selected outcome selected from a plurality of outcomes and indicated in the form of a plurality of symbols 502 on a set of reels 504*a*-504*e*. Among the symbols 502, a single bonus symbol 506 appears on a fifth reel 504*e*, in a middle position. The frequency of the bonus symbol 506 is independent of the wager received from the player. In other words, the frequency of the bonus symbol 506 does not change, regardless of the amount of the wager.

However, based on the player's wager amount, a number of bonus triggers are awarded to the player when bonus symbol 506 appears on a reel or reels. For example, the number of awarded bonus triggers can vary linearly proportionally to the wager amount. In the example of FIG. 5, the player has wagered a total of "4" credits (as indicated in the "Total Bet" box 508). The number of awarded bonus triggers is also "4" and is indicated in the upper left corner of the screen, in a bonus eligibility box 510. Thus, in this example the player receives a bonus trigger for each credit wagered.

The bonus eligibility box 510 currently indicates to the player that "4" bonus triggers have been accumulated. Specifically, four of the bonus trigger icons 512 are highlighted: "1×," "2×," "3×," and "4×."

Figure 6:
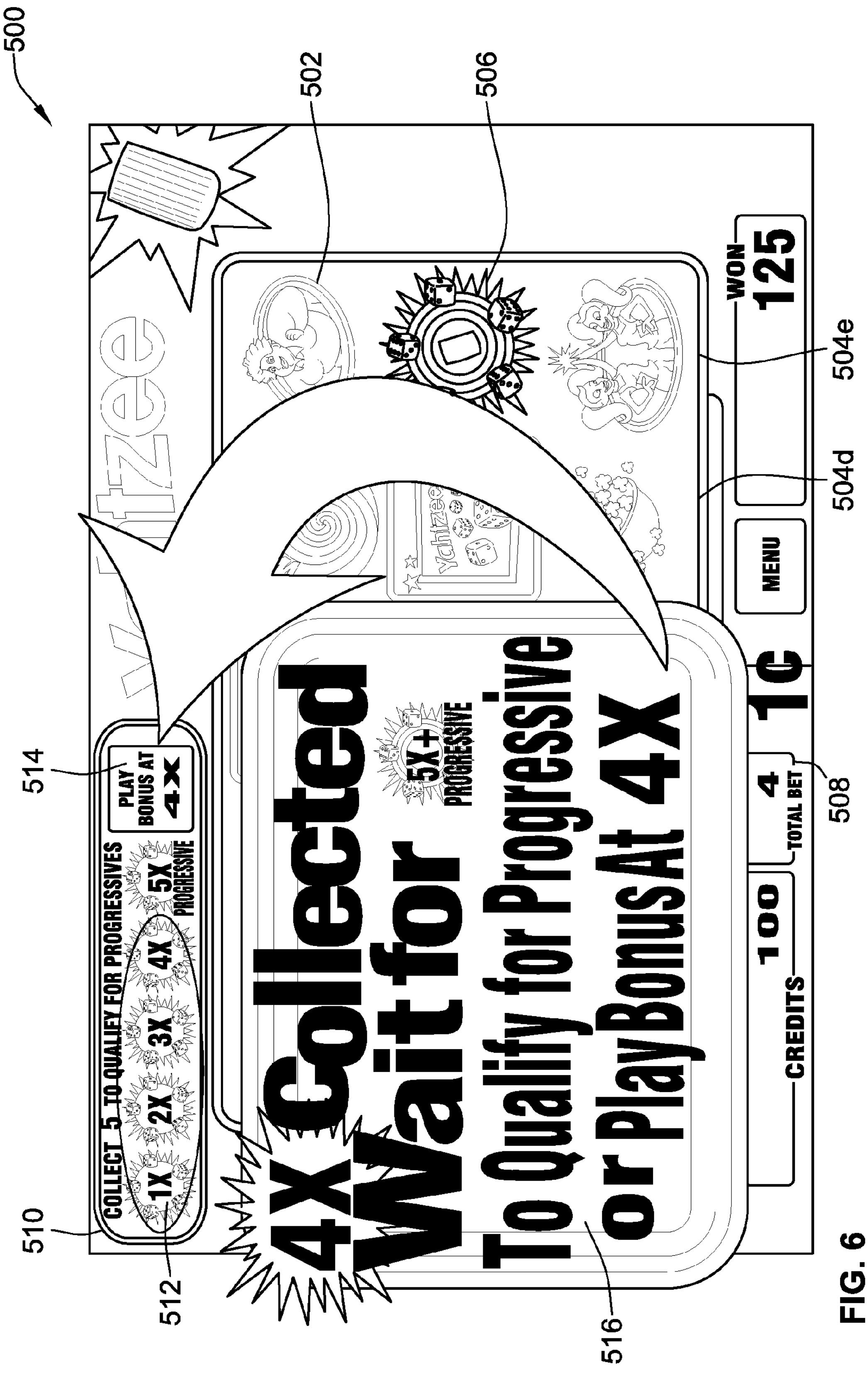
FIG. 6 is an image of the basic-game screen of FIG. 5 illustrating a bonus event instruction.

Referring to FIG. 6, the player can choose to play a bonus event immediately at a "4×" multiplier, without being eligible for the progressive awards, or the player can wait until the bonus symbol 506 occurs again. In this example, collecting five bonus triggers automatically triggers the progressive game in which the player is eligible to receive the progressive awards.

A total trigger box 514 indicates to the player the current eligibility. Since only four bonus triggers have been accumulated, the total trigger box 514 indicates that the player can "Play Bonus at 4×." An optional pop-up window 516 can further clarify to the player that he or she has "4×" bonus triggers "Collected," that the player can "Wait for 5×+ Progressive To Qualify for Progressive," and that the player can "Play Bonus at 4×."

Allowing the player the choice of playing the bonus event whenever the player desires provides the player with a unique strategic decision with respect to playing progressive games (i.e., games in which the player is eligible for receiving a progressive award). In contrast to prior art games, the player is not limited to an "all or nothing" approach in which the player must wager a maximum required amount to be eligible for receiving a progressive award. In accordance with accumulative eligibility criteria of the current progressive game, the player is allowed to play a basic game within their wagering comfort level, but not be excluded from a key piece of the expected value (EV) of the wagering game.

Figure 7:
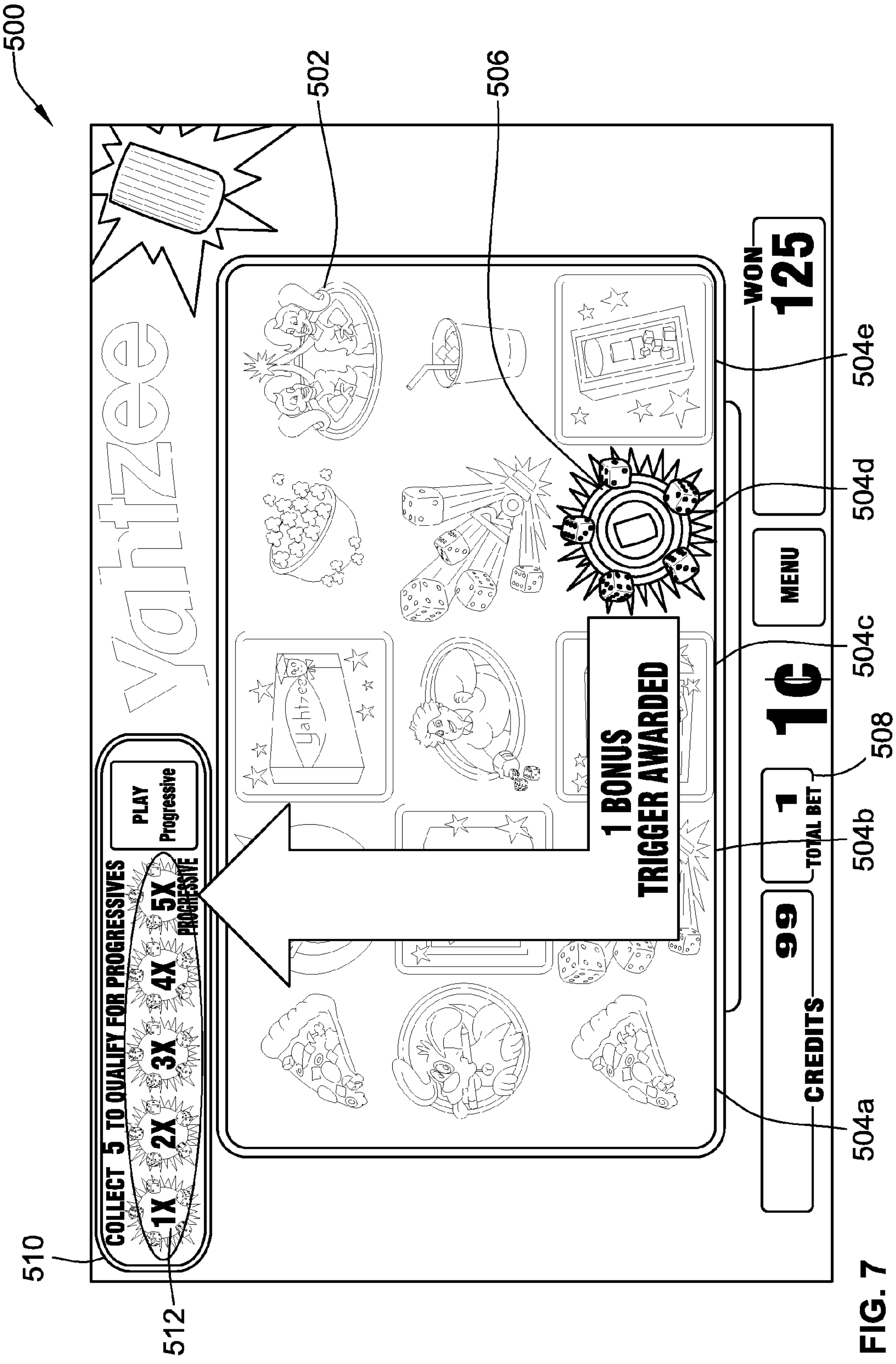
FIG. 7 is an image of another exemplary basic-game screen of the wagering game of FIG. 5 and in which a single bonus trigger is awarded.

Referring to FIG. 7, a subsequent randomly selected outcome has been selected from the plurality of outcomes and has been indicated in the form of the plurality of symbols 502 on the set of reels 504*a*-504*e*. The player has received another bonus symbol 506 on a fourth reel 504*d*, in a bottom position. The player has wagered a single credit, as indicated by the "1" in the "Total Bet" box 508. Since in this particular example the number of awarded bonus triggers vary linearly proportionally with the wager amount, the player is awarded a single bonus trigger.

The bonus eligibility box 510 indicates to the player that "5" bonus triggers have been accumulated. Specifically, all five of the bonus trigger icons 512 are now highlighted: "1×," "2×," "3×," "4×," and "5×."

In other embodiments, other conditions can be imposed for receiving one or more of bonus triggers. For example, the minimum X number of bonus triggers is automatically awarded if the randomly selected outcome is a winning outcome and the player's wager is a maximum wager. Thus, instead of receiving the bonus symbol 506, the player can automatically receive the minimum number of bonus triggers if two conditions are met: (a) any or a specific winning outcome is achieved in the basic game, and (b) a maximum wager is received from the player.

Figure 8:
FIG. 8 is an image of the basic-game screen of FIG. 7 illustrating a progressive game instruction.

Referring to FIG. 8, the player is notified in the total box 514 that he or she can play the progressive game. The pop-up window 516 further clarifies that "5×+" bonus triggers have been collected and that the player is now qualified to play the progressive game in which the player is eligible for receiving one or more of the progressive awards 402*a*-402*h* (shown in FIG. 4).

In response to accumulating the necessary minimum X number of bonus triggers (i.e., five or more triggers), the player can automatically play the progressive game or the player can defer playing the progressive game until a later time. Thus, similar to playing of the bonus event (i.e., when less than the necessary bonus triggers have been accumulated), the playing of the progressive game can be optional in response to receiving a player selection. The player can redeem the accumulated number of bonus triggers at his or her discretion.

If the player accumulates more bonus triggers than the minimum X number of bonus triggers, the number of bonus triggers leftover can carryover towards playing a subsequent progressive game or bonus event. For example, in reference to FIGS. 7 and 8, if the player would have wagered two credits (instead of a single credit), the player would have accumulated a total of six bonus triggers—four bonus triggers from the previous randomly selected outcome (described in reference to FIGS. 5 and 6) and two bonus triggers from the subsequent randomly selected outcome (described in reference to FIGS. 7 and 8). Assuming that the player decided to use five of the six bonus triggers, the one leftover bonus trigger would be carried over.

In the example described above in reference to FIGS. 5-8, the minimum number of bonus triggers required to play the progressive game is "five." However, in alternative embodiments, any X number of bonus triggers can be set as the minimum number.

When redeeming the bonus triggers to play the bonus event, i.e., when the minimum required bonus triggers have not been accumulated, the player is not eligible to play for the progressive awards. Instead, for example, the player is only eligible for winning certain other bonus awards that are different than the progressive awards. Typically, the bonus awards are less than the progressive awards. For example, the bonus awards can be a constant or sub-constant of the reset value of one or more of the progressive awards 402*a*-402*h*. Assuming that the player is eligible to win a linear sub-constant value of the "Natural Yahtzee Progressive" award 402*b*, which has a reset value of $1,000.00, the player could be eligible to win the following bonus awards:

| Number of Triggers | Maximum Award |
|---|---|
| 1 | $200.00 |
| 2 | $400.00 |
| 3 | $600.00 |
| 4 | $800.00 |
| 5 | Full Progressive Award<br>($1,000.00 plus accumulated increment) |

In other words, the player can be eligible to win a bonus award in which each bonus trigger, of the maximum of five bonus triggers, increases the bonus award by twenty percent (with the final bonus trigger increasing the award by at least 20%, as well, but most likely by more than 20%). According to this example, the bonus award for all bonus games triggered by less than the maximum number of bonus triggers is based on the reset value of the progressive award. As such, as an added bonus, the full ("5") number of bonus triggers can be redeemed for the full progressive award, which includes the reset value and any accumulated incremental value of the progressive award. Thus, the player that accumulates the maximum number of bonus triggers is eligible to receive more than a linearly proportional value of the progressive award reset value.

The player (Player A) with the maximum number of bonus triggers (e.g., five bonus triggers) is likely to be eligible for receiving an award with a higher expected value (EV) than a player (Player B) with less than the maximum number of bonus triggers (e.g., four bonus triggers). The expected value, which is generally referred to as the average value over time of an award, is potentially higher for Player A than for Player B. Player B, regardless of whether is eligible for 20%, 40%, 60%, or 80% (for example) of the progressive award, will never be eligible for an expected value that is higher than the expected value associated with the reset value of the progressive award. In other words, the expected value of the award for which Player B would be eligible remains the same. In contrast, Player A is eligible (i) in a worst-case scenario, for the same expected value as Player B (if the progressive award is at the reset value and has not incremented at all) or (ii) in a better and more likely scenario, for a higher expected value than Player B (if the progressive award is based on the reset value an any accumulated increment, as is typical with progressive awards). Thus, the accumulated increment of the progressive award provides an advantage for Player A, by increasing the expected value of the award for which Player A is eligible to receive.

Figure 9:
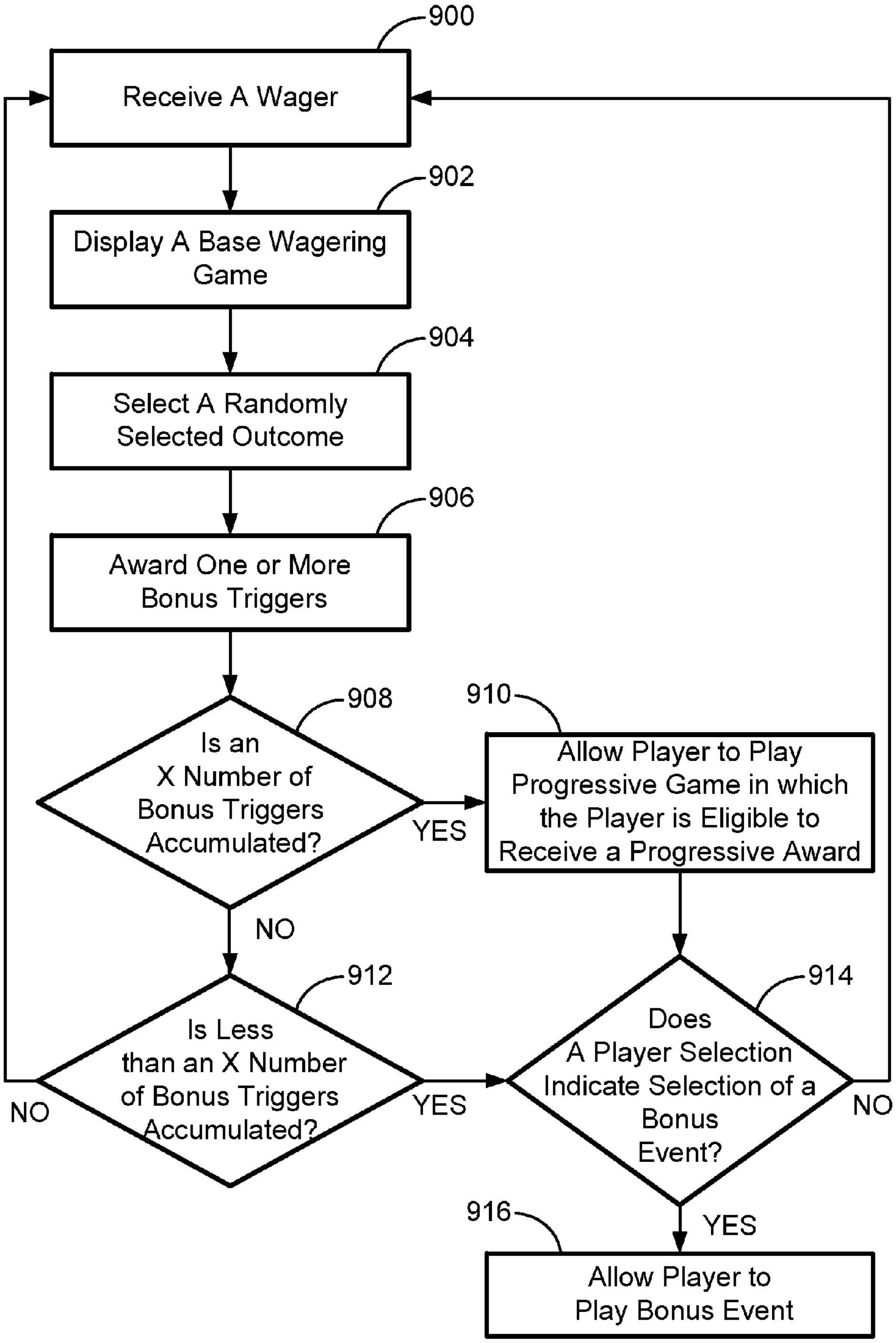
FIG. 9 is a flowchart for an algorithm that corresponds to instructions executed by a controller in accord with at least some aspects of the disclosed concepts.

FIG. 9, described by way of example above, represents one algorithm that corresponds to at least some instructions executed by the controller 42 and/or external systems 46 in FIG. 2 to perform the above described functions associated with the disclosed concepts.

For example, a wager is received (900) and a base wagering game is displayed (902) in which a randomly selected outcome (904) is selected. One or more triggers are awarded (906) in the randomly selected outcome. If an X number of bonus triggers is accumulated (908), then a player is allowed to play a progressive game in which the player is eligible to receive a progressive award (910).

If an X number of bonus triggers is not accumulated (908), a first determination is made whether at least one bonus trigger is accumulated (912). In other words, the first determination inquires whether the number of bonus triggers is more than zero (i.e., at least one), but less than X (i.e., less than the minimum number required for eligibility to win the progressive award). If it is determined that less than an X number of bonus triggers is accumulated (912), a second determination is made whether a player selection indicates selection of playing a bonus event (914). In the bonus event, the player is eligible to win a bonus award. The bonus award can be, for example, a percentage of the progressive reset award.

If the player makes a selection to indicate selection of the bonus event (914), the player is allowed to play the bonus event in which the player is eligible to receive the bonus award (916). Otherwise, a wager is received (900) from the player to cause the display of the base wagering game and the selection of a next randomly selected outcome.

Each of these embodiments and obvious variations thereof is contemplated as falling within the spirit and scope of the claimed invention, which is set forth in the following claims.

What is claimed is:

1. A method of conducting a wagering game, comprising:

receiving a wager via a wager input device from a player;

displaying on a display a base wagering game in response to receiving the wager;

selecting, by at least one of one or more processors, an initial randomly selected outcome from a plurality of outcomes of the base wagering game;

awarding, by at least one of the one or more processors, one or more bonus triggers in the initial randomly selected outcome of the base wagering game;

selecting, by at least one of the one or more processors, a subsequent randomly selected outcome from the plurality of outcomes of the base wagering game;

awarding, by at least one of the one or more processors, at least one additional bonus trigger in the subsequent randomly selected outcome of the base wagering game;

accumulating, by at least one of the one or more processors, a number of bonus triggers based on the at least one additional bonus trigger and the one or more bonus triggers;

in response to accumulating the number of bonus triggers, allowing the player to play a progressive game having a first expected value if an X number of bonus triggers is accumulated, the player being eligible to receive a progressive award in the progressive game, and allowing the player to play a bonus event that is different than the progressive game, the bonus event having a second expected value and being played if (i) less than the X number of bonus triggers is accumulated, and (ii) a selection is received to indicate player selection of the bonus event, the bonus event having a bonus award that is less than the progressive award, wherein the second expected value is less than or equal to the first expected value.

2. The method of claim 1, further comprising automatically allowing the player to play the progressive game once the X number of bonus triggers is accumulated.

3. The method of claim 1, further comprising indicating at least one of the initial randomly selected outcome and the subsequent randomly selected outcome via symbols arranged in a plurality of reels, at least one of the symbols being a bonus symbol indicative of at least one bonus trigger.

4. The method of claim 3, further comprising awarding the number of bonus triggers as a function of the wager received from the player.

5. The method of claim 4, wherein the number of bonus triggers is directly proportional to the wager received from the player.

6. The method of claim 5, wherein the X number of bonus triggers is awarded in at least one of the initial randomly selected outcome and the subsequent randomly selected outcome if (a) at least one of the initial randomly selected outcome and the subsequent randomly selected outcome includes the bonus symbol and (b) the wager is a maximum wager.

7. The method of claim 1, further comprising determining the bonus award to be a percentage of a reset value of the progressive award as a function of the number of bonus triggers accumulated.

8. The method of claim 1, wherein the first expected value increases with respect to the second expected value until the progressive award is awarded.

9. A gaming system, comprising:

a wager input device for receiving a wager from a player;

a display for displaying a base wagering game in response to receiving the wager from the player; and one or more processors communicatively coupled to the display, at least one of the processors being operative to select at least an initial randomly selected outcome and a subsequent randomly selected outcome from a plurality of outcomes of the base wagering game;

award one or more bonus triggers in each of the initial randomly selected outcome and the subsequent randomly selected outcome of the base wagering game;

accumulate a number of bonus triggers based on the one or more bonus triggers awarded;

if an X number of bonus triggers is accumulated, allow the player to play a progressive game having a first expected value; and if less than the X number of bonus triggers is accumulated and in response to receiving a player selection, allow the player to play a bonus event different than the progressive game, the bonus event having a second expected value that is less than or equal to the first expected value.

10. The gaming system of claim 9, wherein the at least one of the processors is further operative to automatically allow the player to play the progressive game once the X number of bonus triggers is accumulated.

11. The gaming system of claim 9, wherein a bonus symbol is displayed on a reel of a plurality of reels, the bonus symbol being indicative of at least one bonus trigger.

12. The gaming system of claim 11, wherein the at least one of the processors is further operative to award the number of bonus triggers as a function of the wager received from the player.

13. The gaming system of claim 12, wherein the number of bonus triggers is directly proportional to the wager received from the player.

14. The method of claim 13, wherein the X number of bonus triggers is awarded in at least one of the initial randomly selected outcome and the subsequent randomly selected outcome if (a) at least one of the initial randomly selected outcome and the subsequent randomly selected outcome includes the bonus symbol and (b) the wager is a maximum wager.

15. The gaming system of claim 9, wherein the at least one of the processors is further operative to award a progressive award in the progressive game.

16. The gaming system of claim 15, wherein the at least one of the processors is further operative to award a bonus award in the bonus event, the bonus award being less than the progressive award.

17. The gaming system of claim 16, wherein the at least one of the processors is further operative to determine the bonus award as a percentage of a reset value of the progressive award.

18. The gaming system of claim 17, wherein the at least one of the processors is further operative to determine the percentage of the progressive award as a function of the number of bonus triggers accumulated.

19. The gaming system of claim 9, wherein the first expected value increases with respect to the second expected value until the progressive award is awarded.

20. A method of conducting a wagering game for a human player, the wagering game including a game sequence in which the player provides an input and a wagering game outcome is determined, the method comprising the acts of:

using a user interface device to accept the player input, and transforming the player input to electronic data signals indicative of a wager to play the wagering game;

using one or more processors to interpret the wager from the data signals and to cause the recording of a digital representation of the wager in one or more storage devices;

using at least one of the processors to initiate the game sequence of the wagering game;

using at least one of the processors to cause at least one of the display devices to display a base wagering game;

using at least one of the processors to select an initial randomly selected outcome from a plurality of outcomes of the base wagering game, award one or more bonus triggers in the initial randomly selected outcome of the base wagering game, select a subsequent randomly selected outcome from the plurality of outcomes of the base wagering game, award at least one additional bonus trigger in the subsequent randomly selected outcome of the base wagering game, accumulate a number of bonus triggers based on the at least one additional bonus trigger to the one or more bonus triggers, if an X number of bonus triggers is accumulated, allow the player to play a progressive game having a first expected value, and if less than the X number of bonus triggers is accumulated and in response to receiving a player selection, allow the player to play a bonus event different than the progressive game, the bonus event having a second expected value that is less than or equal to the first expected value; and determining an outcome of the game sequence.

21. The method of claim 20, further comprising:

indicating at least one of the initial randomly selected outcome and the subsequent randomly selected outcome via symbols arranged in a plurality of reels, at least one of the symbols being a bonus symbol indicative of at least one bonus trigger; and awarding the number of bonus triggers as a function of the wager received from the player.

22. The method of 20, further comprising:

awarding a progressive award in the progressive game and a bonus award in the bonus event; and determining the bonus award to be a percentage of the progressive award as a function of the number of bonus triggers accumulated.

* * * * *